(12) United States Patent
Wise

(10) Patent No.: US 7,819,111 B2
(45) Date of Patent: Oct. 26, 2010

(54) PORTABLE BIMODAL TILE SAW

(75) Inventor: Robert Wise, 365 Ely Rd., Petaluma, CA (US) 94954

(73) Assignee: Robert Wise, Petaluma, CA (US)

( * ) Notice: Subject to any disclaimer, the term of this patent is extended or adjusted under 35 U.S.C. 154(b) by 586 days.

(21) Appl. No.: 11/622,427

(22) Filed: Jan. 11, 2007

(65) Prior Publication Data
US 2007/0197139 A1 Aug. 23, 2007

Related U.S. Application Data

(60) Provisional application No. 60/758,805, filed on Jan. 13, 2006.

(51) Int. Cl.
B28D 1/04 (2006.01)
(52) U.S. Cl. .................. 125/13.01; 83/171; 125/13.03; 451/450
(58) Field of Classification Search .................. 83/169, 83/171, 471.2, 471.3; 125/13.01, 13.03; 451/449, 450
See application file for complete search history.

(56) References Cited

U.S. PATENT DOCUMENTS

| 3,388,414 | A | * | 6/1968 | Hilty et al. ..................... 15/93.1 |
| 4,428,159 | A | * | 1/1984 | Sigetich et al. ............. 451/213 |
| 4,574,670 | A | * | 3/1986 | Johnson ........................ 83/409 |
| 4,738,573 | A | * | 4/1988 | Johnson, Jr. ................. 409/184 |
| 4,976,251 | A | | 12/1990 | Smith |
| 5,365,812 | A | * | 11/1994 | Harnden ........................ 83/34 |
| 5,741,175 | A | * | 4/1998 | Voege ........................ 451/455 |
| 5,947,103 | A | | 9/1999 | Saccon |
| 6,000,387 | A | * | 12/1999 | Lee .......................... 125/13.01 |
| 6,119,676 | A | | 9/2000 | Greenland |
| 6,152,127 | A | * | 11/2000 | Fuhrman et al. .............. 125/35 |
| D442,977 | S | | 5/2001 | Howard |
| 6,273,081 | B1 | * | 8/2001 | Gorgol et al. ............. 125/13.01 |
| 6,276,990 | B1 | | 8/2001 | Greenland |
| 6,283,110 | B1 | * | 9/2001 | Lee .......................... 125/13.01 |
| 6,347,624 | B1 | | 2/2002 | Smith et al. |
| D458,282 | S | | 6/2002 | Greenland |
| 6,397,831 | B1 | | 6/2002 | Plunger et al. |
| 6,427,677 | B1 | | 8/2002 | O'Banion et al. |
| 6,460,533 | B1 | | 10/2002 | Greenland |
| 6,550,363 | B2 | * | 4/2003 | He ............................ 83/471.3 |
| 6,637,424 | B1 | | 10/2003 | Fuhrman et al. |
| 6,845,768 | B2 | | 1/2005 | O'Banion et al. |
| 6,886,836 | B1 | | 5/2005 | Wise |

(Continued)

Primary Examiner—Timothy V Eley
(74) Attorney, Agent, or Firm—Michael A. Glenn; Glenn Patent Group

(57) ABSTRACT

A bimodal tile saw includes a tray supported on a base extending in a first direction and a water-cooled saw unit suspended from a telescoping arm. Both the tray and the saw unit move relative to the base along the first direction. In a first mode, the saw unit is fixed and the substrate is fed to the saw unit by advancing the tray. In a second mode, the table is fixed and the telescoping arm is advanced using ergonomic handles to bring the blade into contact with the substrate. A laser cutting guide casts a precise beam across the work piece for accurate cutting. An integrated handtruck, having a handle and folding legs actuated by gas pistons allows easy transport and setup of the tile saw. During use, a retractable foot elevates the wheels off of the ground. Water shields protect the saw unit's motor and external environment.

16 Claims, 12 Drawing Sheets

U.S. PATENT DOCUMENTS 6,901,834 B2 * 6/2005 Chang ................... 83/486.1
7,387,120 B2 * 6/2008 O'Banion et al. ........ 125/23.02
2002/0084448 A1 7/2002 Nowell et al.
2005/0051015 A1 3/2005 Zhang

* cited by examiner

PORTABLE BIMODAL TILE SAW

CROSS REFERENCE TO RELATED APPLICATIONS

This application claims benefit of U.S. provisional patent application Ser. No. 60/758,805, filed Jan. 13, 2006, the entirety of which is herein incorporated by this reference thereto.

BACKGROUND OF THE INVENTION

1. Field of the Invention

The invention generally relates to tools for cutting stone, masonry and ceramic tile. More particularly the invention relates to a portable, bimodal tile saw.

2. Background Information

Power saws for cutting tile and ceramics have been known for some time. The prior art provides many examples of tile saws which are operated by securing the work piece on a movable table. The table and the secured work piece are then advanced toward the blade. A recognized disadvantage to this arrangement was that it was unsuitable for making precision cuts in large pieces.

A proposed remedy for this disadvantage was a tile saw that resembled a table saw for wood, providing a planar surface for supporting the tile. A saw protruded from the planar surface, allowing large pieces of tile to be cut in a single pass. While this approach allowed large pieces of tile to be cut, it posed a safety hazard for the operator due to the proximity of the operator's hands to the moving blade while the substrate was being cut.

Tile saws wherein the saw unit is mounted on an arm that extends over the supporting table are also known. In some cases, the arm extends over the supporting table from one end. In other cases, the arm extends over the supporting table from the side. The table and the substrate are then advanced toward the saw blade in order to cut the substrate. However, the presence of a fixed arm places a limit on the size and shape of tiles that can be cut using such devices.

Tile saws having arms that could be switched from one fixed position to another are also known. The ability to change the position of the arm does make it easier to cut large pieces, however, during operation, the arm is fixed. Thus, in order to change the position of the arm and the saw unit, the operator must stop work in order to change position of the arm and then secure the arm before starting work again.

A tile saw wherein the saw unit is mounted on a movable, unshaped arm is known. The arm is mounted on a pair of tracks and can be moved relative to the supporting table during operation. Additionally, the arm can remain stationary and the table moved toward the saw unit. However, because the entire arm unit must be moved in order to advance the saw unit, the presence of the arm has the potential to limit the size of the substrate being cut. Additionally, providing and maintaining the moveable arm assembly adds considerably to manufacturing and repair costs for such a device.

Portable tile saws are known within the art. The portability of such devices owes to their being relatively compact. However, in fact, such devices can only be deployed to a job site with difficulty. Although they are somewhat compact, ordinarily, they need to be carried by at least two people because of their weight and bulkiness. If such a tile saw needs to be carried over long distance or over difficult terrain, the difficulty of transporting and deploying the saw becomes even more difficult.

Their therefore exists a need in the art for an apparatus that can readily make precision cuts in even large pieces of tile. Additionally, there is a need for such apparatus that can be easily transported and set up, and that can be easily stowed in between uses.

SUMMARY OF THE INVENTION

A bimodal tile saw includes a tray supported on a base extending in a first direction and a water-cooled saw unit suspended from a telescoping arm. Both the tray and the saw unit move relative to the base along the first direction. In a first mode, the saw unit is fixed and the substrate is fed to the saw unit by advancing the tray. In a second mode, the table is fixed and the telescoping arm is advanced using ergonomic handles to bring the blade into contact with the substrate. A laser cutting guide casts a precise beam across the work piece for accurate cutting. An integrated handtruck, having a handle and folding legs actuated by gas pistons allows easy transport and setup of the tile saw. During use, a retractable foot elevates the wheels off of the ground. Water shields protect the saw unit's motor and external environment.

DETAILED DESCRIPTION

A bimodal tile saw includes a tray supported on a base extending in a first direction and a water-cooled saw unit suspended from a telescoping arm. Both the tray and the saw unit move relative to the base along the first direction. In a first mode, the saw unit is fixed and the substrate is fed to the saw unit by advancing the tray. In a second mode, the table is fixed and the telescoping arm is advanced using ergonomic handles to bring the blade into contact with the substrate. A laser cutting guide casts a precise beam across the work piece for accurate cutting. An integrated handtruck, having a handle and folding legs actuated by gas pistons allows easy transport and setup of the tile saw. During use, a retractable foot elevates the wheels off of the ground. Water shields protect the saw unit's motor and external environment.

Figure 1:
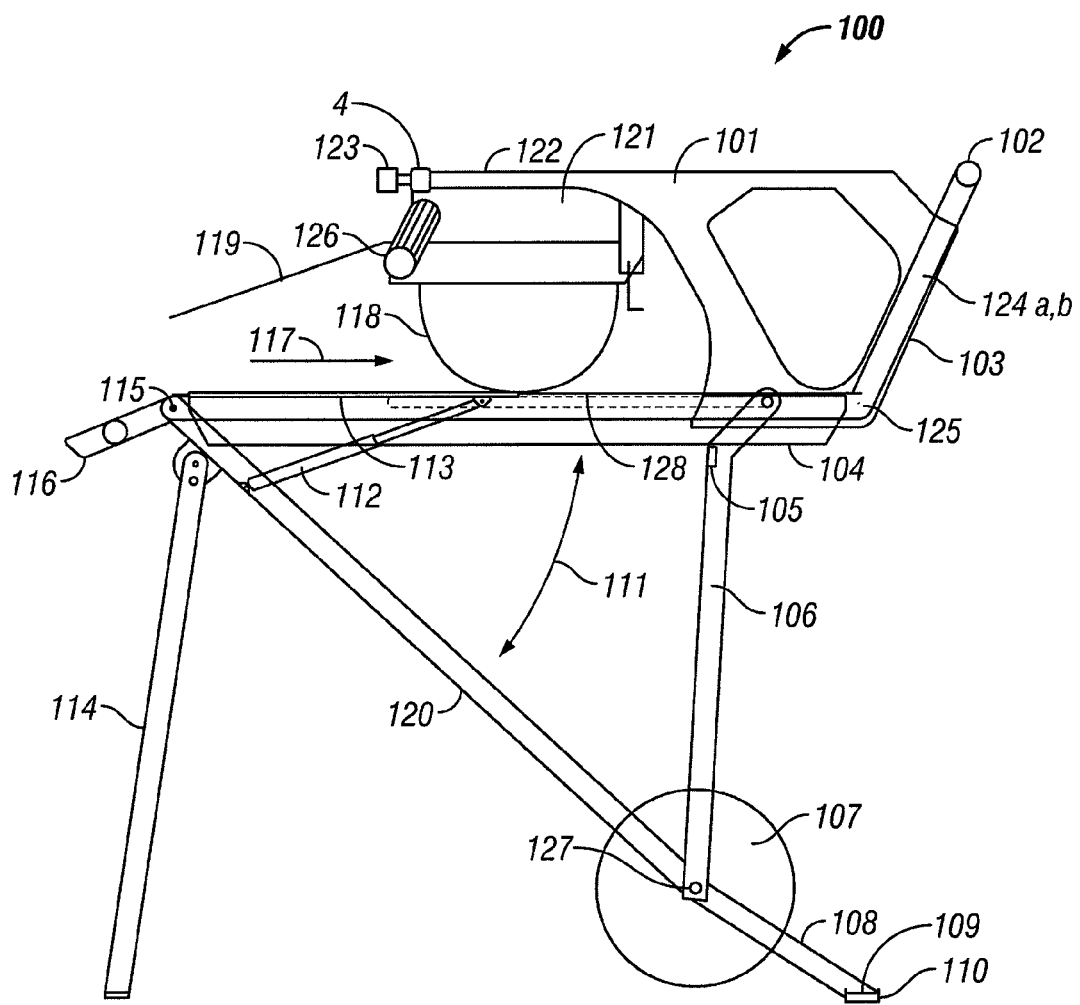
FIG. 1 shows a side view of a portable, bimodal tile saw set up to be used in sliding table mode.

Referring now to FIG. 1, shown is a view 100 of a portable, bimodal tile saw set up to be used in sliding tray mode. A housing 101 is securely affixed to a sub-frame 125. The sub-frame itself is formed from a pair of members 124a and 124b attached to each other by means of a cross brace 115, resulting in a substantially rectangular sub-frame 125. In one embodiment, the cross brace 115 and the two members are preferably welded together. In other embodiments that separate elements of the sub-frame are securely screwed or bolted together using commonly-known hardware elements. Additionally, the sub-frame, at the end opposite the cross brace 115 terminates in a handle 102 for transporting and lifting the tile saw. When the tile saw is stowed between uses the handle serves as a foot for the wheeled base of the tile saw, which is described infra.

In one embodiment, the housing 101 is permanently affixed to the sub-frame by welding the two elements. In another embodiment, the housing 101 is securely but removeably attached to the sub-frame using conventional fasteners such as screws and/or bolts. In one embodiment, the rear surface 103 of the housing 101 is solid, in order to shield walls and floors of the surrounding environment from splashing and spraying of liquid used to cool the saw blade 118. Additionally, the remaining portions of the housing are shaped and configured to contain splashed and sprayed coolant in order to protect surfaces at the job site such as walls, floors and ceilings, encouraging the coolant to drain back into the coolant reservoir as described within.

The housing 101 also includes an integral arm 122 that extends over the slide tray 113. In one embodiment, the housing 101 is die-cast, preferably from a metal substrate such as aluminum or stainless steel. In another embodiment, the housing is injection-molded from a resin of sufficient durability to provide a safe, durable enclosure for the saw unit 121 suspended from the arm 122 within the housing 101.

The saw unit 121 is suspended within the housing 101 on a track mechanism that extends from the rear portion of the housing 101 toward the terminal portion of the arm 122. The track from which the saw unit 121 is suspended is configured such that the saw unit 121 is freely moveable along the track in either direction by an operator using the handles 126. Parts and systems for allowing an element suspended from a track to be freely moved along the track are commonly known.

Figure 2A:
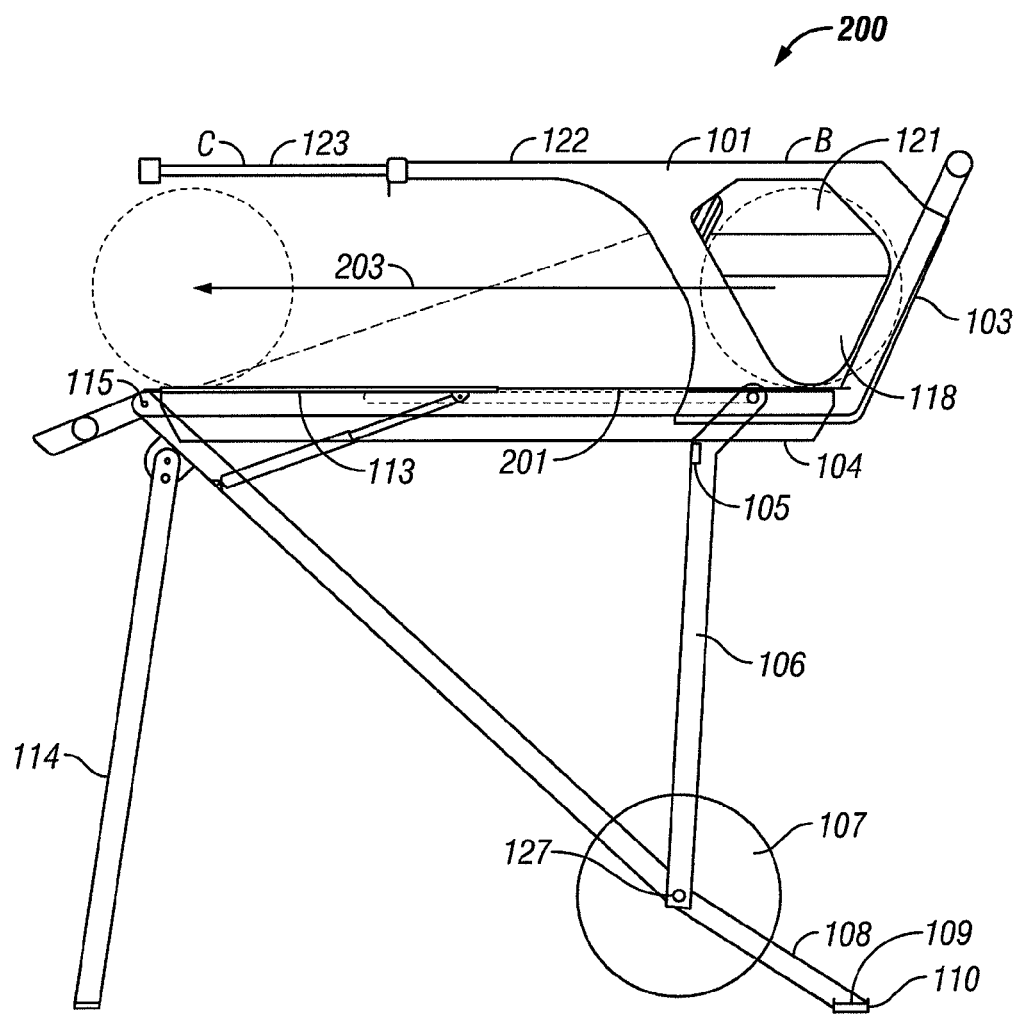
FIGS. 2a and 2b show a side and isometric views, respectively, of a portable, bimodal tile saw tile saw set up to be used in sliding saw mode.

The arm 122 includes a second stage 123 that retracts into the housing 101, as in FIG. 1. However, when the operator pulls the saw unit 121 beyond the fixed end of the arm 122, the second stage is withdrawn from the housing 121, potentially telescoping full length to position 'C,' as shown in FIGS. 2a and b.

In the 'sliding tray' mode of operation, the saw unit is advanced to, for example position 'A' and securely fastened into place. In one embodiment, securing the saw unit 121 is accomplished by means of a latch mechanism. In separate embodiments the latch mechanism is either automatic or operator-actuated.

With the saw unit 121 fixed at position 'A,' the work piece is placed on a moveable slide tray 113. As explained within, the moveable slide tray 113 is freely moveable by means of rollers in direction 117 toward the blade 118 of the saw unit 121 and in the reverse. Thus, in 'sliding tray' mode, the work piece is cut by bringing the work piece into contact with the stationary saw unit 121 using the moveable slide tray 113.

The saw unit 121 includes a motor-driven circular saw, preferably an electric saw. The saw unit also includes a laser cutting guide 119 which casts a precise beam across the work piece for accurate cutting.

In one embodiment, the saw unit 121 accepts a 12" circular blade. However, such embodiment is exemplary. Other embodiments using different size blades are possible and are within the scope of the invention. Preferably, the saw blade 118 is a diamond blade. However, other blade types suitable for cutting materials such as ceramic tile, stone and masonry will occur to those of ordinary skill and are within the scope of the invention.

The saw blade 118 is water-cooled by means of a coolant such as water that is delivered from a reservoir using a conventional pump. The use of a pump to deliver coolant from a reservoir to a cutting implement is commonly known. A removable water tray 104 serves as a reservoir for cooling water delivered to the saw blade 118. Preferably, the water tray 104 is at least 3" in depth. While water is moved from the water tray 104 in the direction of the saw blade 118 by means of a conventional water pump, advantageously, the water is delivered directly to the saw blade by means of separate water lines, each of which delivers water to a separate side of the blade. Thus, the saw blade 118 is cooled by water delivered to both sides of the blade 118. As will be. explained later, the sliding tray 113 is provided with a series of engineered holes through which the coolant drains back into the tray 104, conserving coolant and minimizing the amount splashing and overspray on the operator and surfaces in the surrounding environment.

Removeably attached to the sub-frame is an integrated handtruck that lends the tile saw a high degree of mobility and portability. Advantageously, the integrated handtruck collapses readily, rendering the tile saw easily transportable and storable.

The integrated handtruck includes a pair of vertical supports 106 at opposing sides of sub-frame 125. The vertical supports are preferably fastened together by means of a cross brace 105 toward their proximal ends. The proximal end of each vertical support is configured with a member to be received by a vertical support track 128 so that the vertical support 106 can slide freely within the vertical support track 128. The vertical support track 128 is fixedly attached to an interior surface of the sub-frame 125.

The hand truck further includes a pair of fold-out legs 120 rotateably attached to the sub-frame 125. Each of the fold-out legs is further attached to a first end of a gas-filled cylinder and piston assembly 112. The second end of the gas-filled cylinder and piston assembly 112 is attached to an interior surface of the sub-frame 125.

The distal ends of each of the vertical supports 106 and the fold-out legs 120 are configured with circular holes through which an axle 127 is placed for a pair of wheels 107. The wheel assembly will be described in greater detail below. The axle 127 also has the effect of unifying the vertical supports and the legs into a single structure. The wheels 107 are affixed to the axle by means of a nut or other suitable hardware.

The handtruck includes another fold-down leg 114, equipped with a resilient foot, attached at the rear of the sub-frame 125. The handtruck further includes a pair of fold-down supports 108, attached by crossbar 109, equipped with resilient feet 110.

Figure 10:
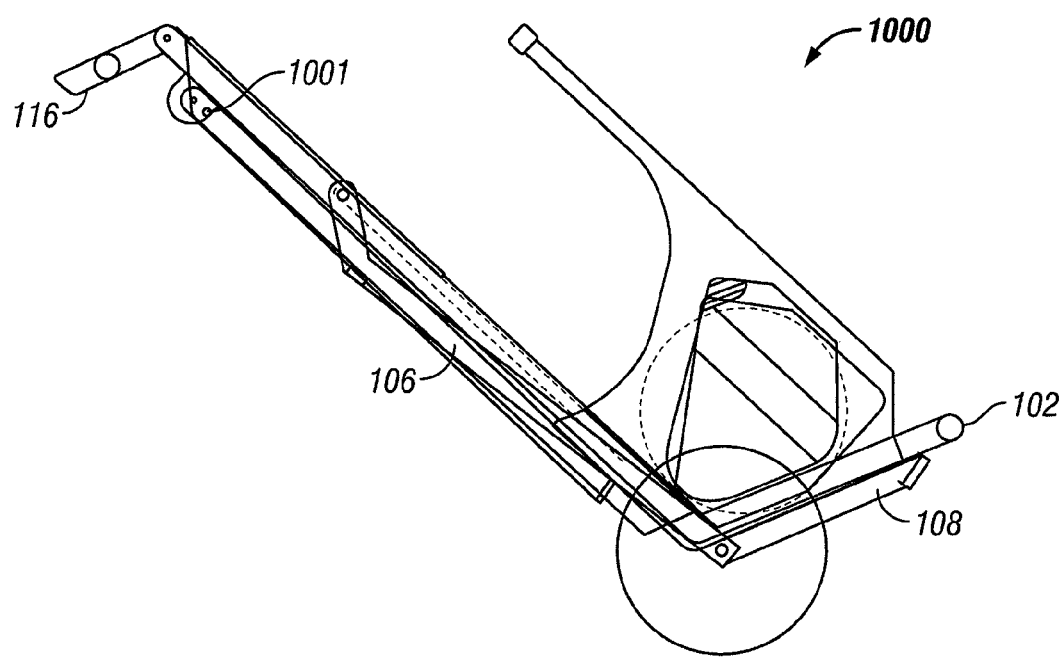
FIG. 10 shows a view of a portable bimodal tile saw configured for transport.
Figure 11:
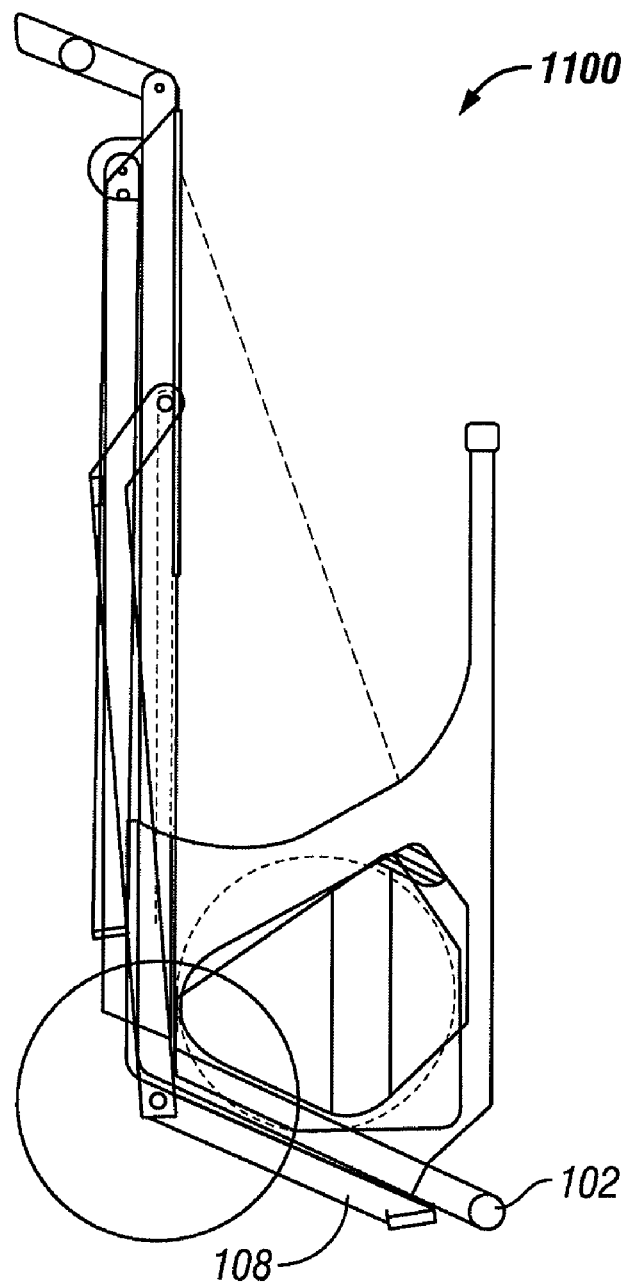
FIG. 11 shows a view of a portable bimodal tile saw collapsed for storage.

The sub-frame 125 further includes a second handle 116 for navigating the hand truck when it is collapsed, as shown in FIGS. 10 and 11.

The hydraulic effect contributed by the gas and piston assemblies 112 allows the operator to deploy and stow the tile saw very easily with a minimum of effort. For example, if the operator wishes to set up the tile saw, starting from the positions shown in FIG. 10 or 11, he simply flips the fold-down leg 114 down and lifts the saw to working height, assisted by the hydraulic action of the cylinder and piston assemblies 112. As the operator lifts, the legs 120 fold down and the vertical supports 107 slide forward in their tracks 120 to drop down.

Advantageously, the fold-down supports 108 are operative to raise the wheels 107 off of the supporting surface, thus lending the tile saw exceptional stability during use.

When stowing the tile saw, as in FIGS. 10 and 11, the hydraulic action of the cylinder and piston assemblies 112 resists downward movement of the apparatus so that the legs and vertical supports retract relatively slowly without the operator needing to control their downward movement.

As the fold-down legs 120 traverse arc 111 in either. direction, the movement of the fold-down legs 120 causes the vertical supports 106 to slide within their tracks 120 in one direction or the other. As the fold-down legs 120 fold downward, their movement causes the supports 106 to slide toward the distal end of the tile saw. When the legs 120 fold up, their movement, in turn, causes the vertical supports 106 to slide toward the operator-facing end of the tile saw, causing the handtruck to collapse, as shown in FIGS. 10 and 11, with the downward movement of the tile saw being damped by the cylinder and piston assemblies 112.

Figure 5:
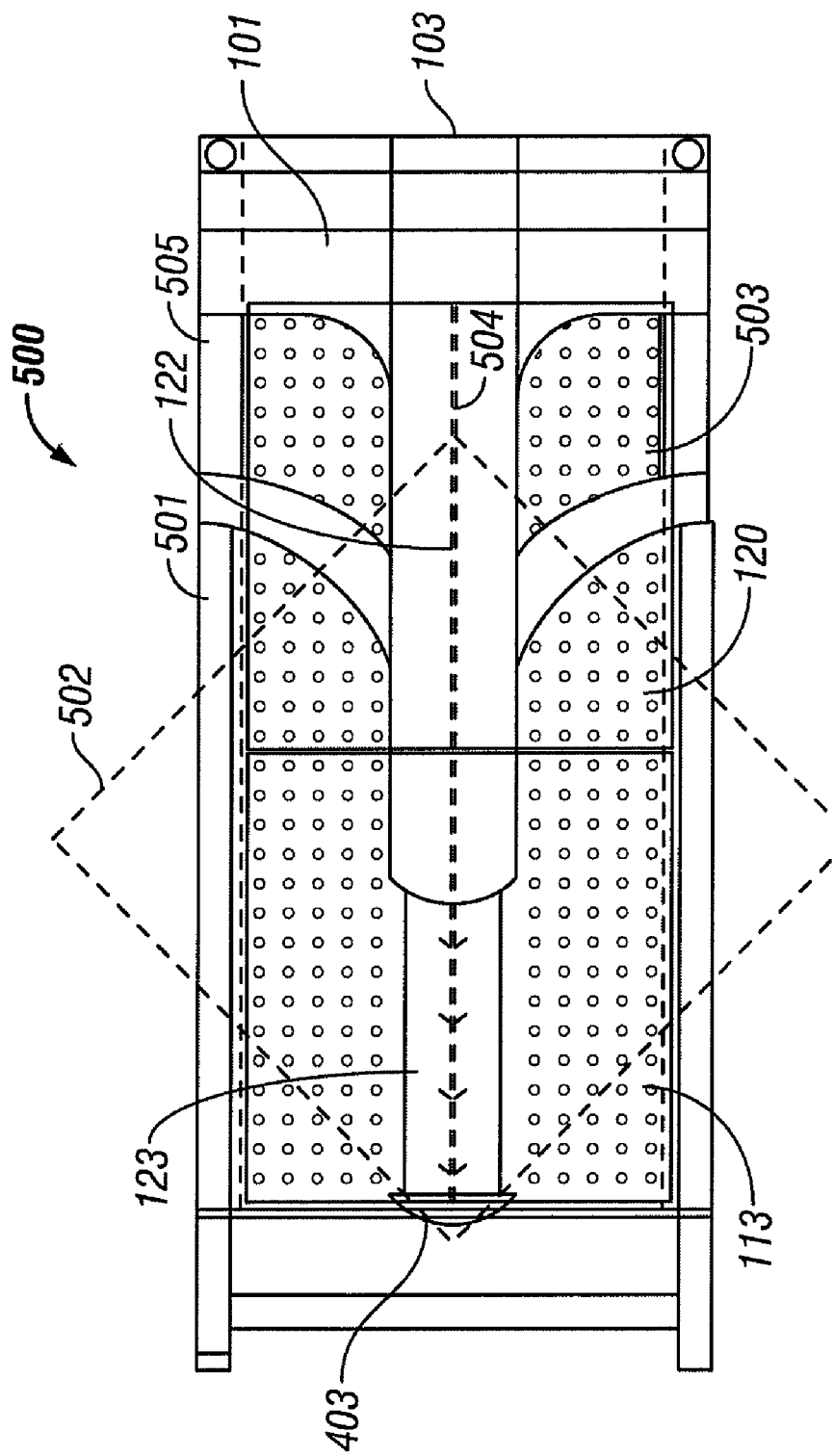
FIG. 5 shows a top plan view of a portable, bimodal tile saw.

Turning now to FIG. 2a, shown is a side view 200 of the file saw in 'sliding saw' mode. As shown here, the second stage 123 of the arm 122 is in its fully telescoped position by the movement of the saw unit 121. The saw unit itself is shown at rest in position 'B.' The arrow 203 indicates the potential range of motion of the saw unit 121. Thus, in 'sliding saw' mode, the operator can slide the saw unit 121 along the arm 122 and its telescoping second stage 123 between position 'B' and position 'C,' wherein the second stage 123 of the arm 122 is fully telescoped. Thus, by keeping the work piece stationary and sliding the saw unit along the telescoped arm, the operator has the ability to cut much larger pieces of tile. For example, as shown in FIG. 5 (504) an exemplary embodiment allows cuts of up to 34", which is the diagonal dimension of a 24" square tile. Such dimension is given only for descriptive purposes. Other dimensions, both larger and smaller than the exemplary dimension are within the scope of the invention.

Figure 6:
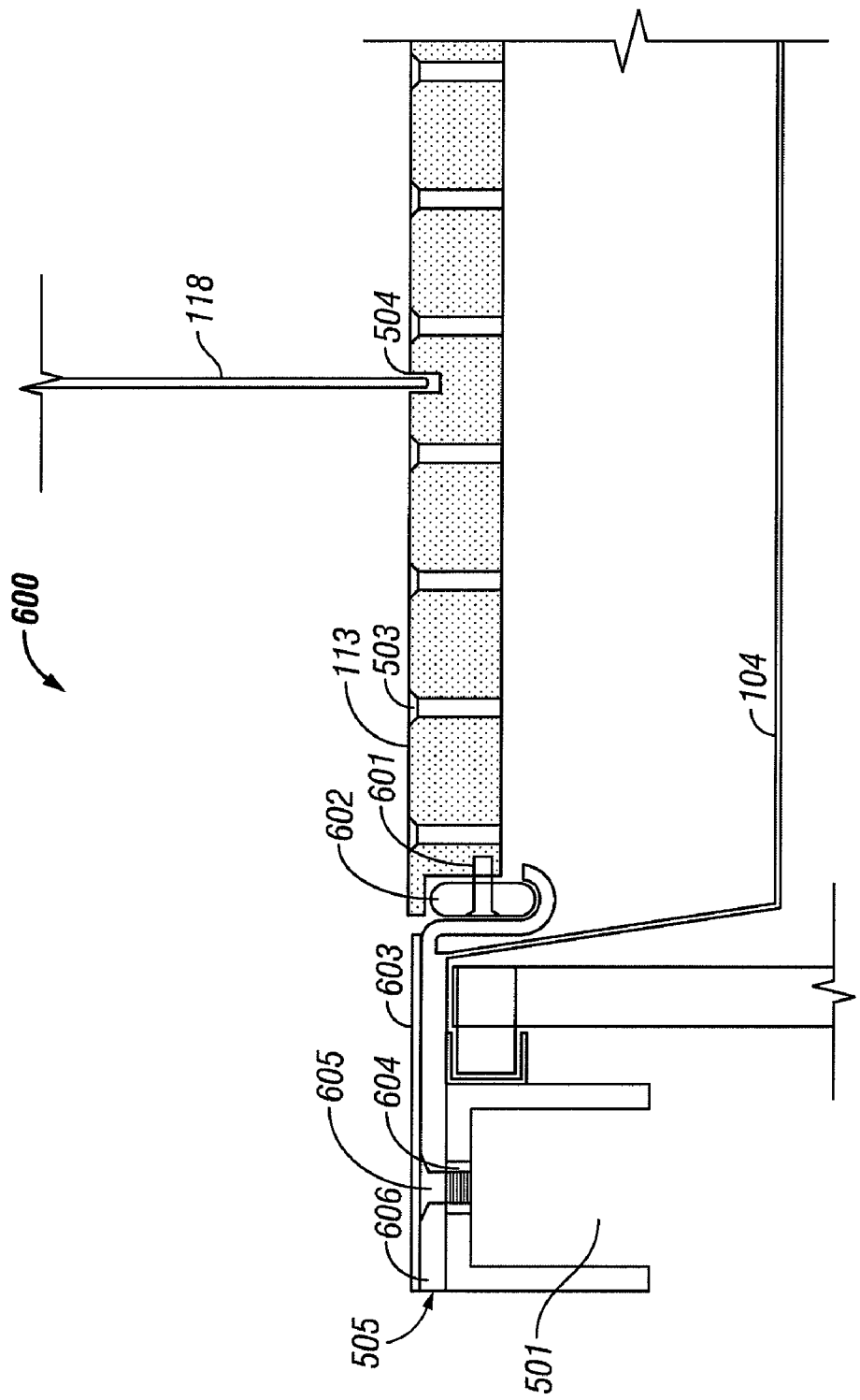
FIG. 6 shows a detailed view of a roller tray and track assembly in a portable, bimodal tile saw.

In addition to the sliding tray 113, FIG. 2a shows a back stationary tray 120 inserted into the frame behind the sliding tray 113. The back stationary tray 120 is secured by fitting it into holes in the tracks for the sliding tray 113. The back stationary tray 120 is provided with finger pockets that facilitate insertion and removal of the tray. As shown in FIGS. 5 and 6, both trays feature a blade groove, also known as a kerf 118, down the center and counter-sunk drainage holes. In one embodiment, the drainage holes have a diameter of about 3/16" and are arranged in a grid pattern. Other arrangements of drain holes are within the scope of the invention.

Figure 2B:
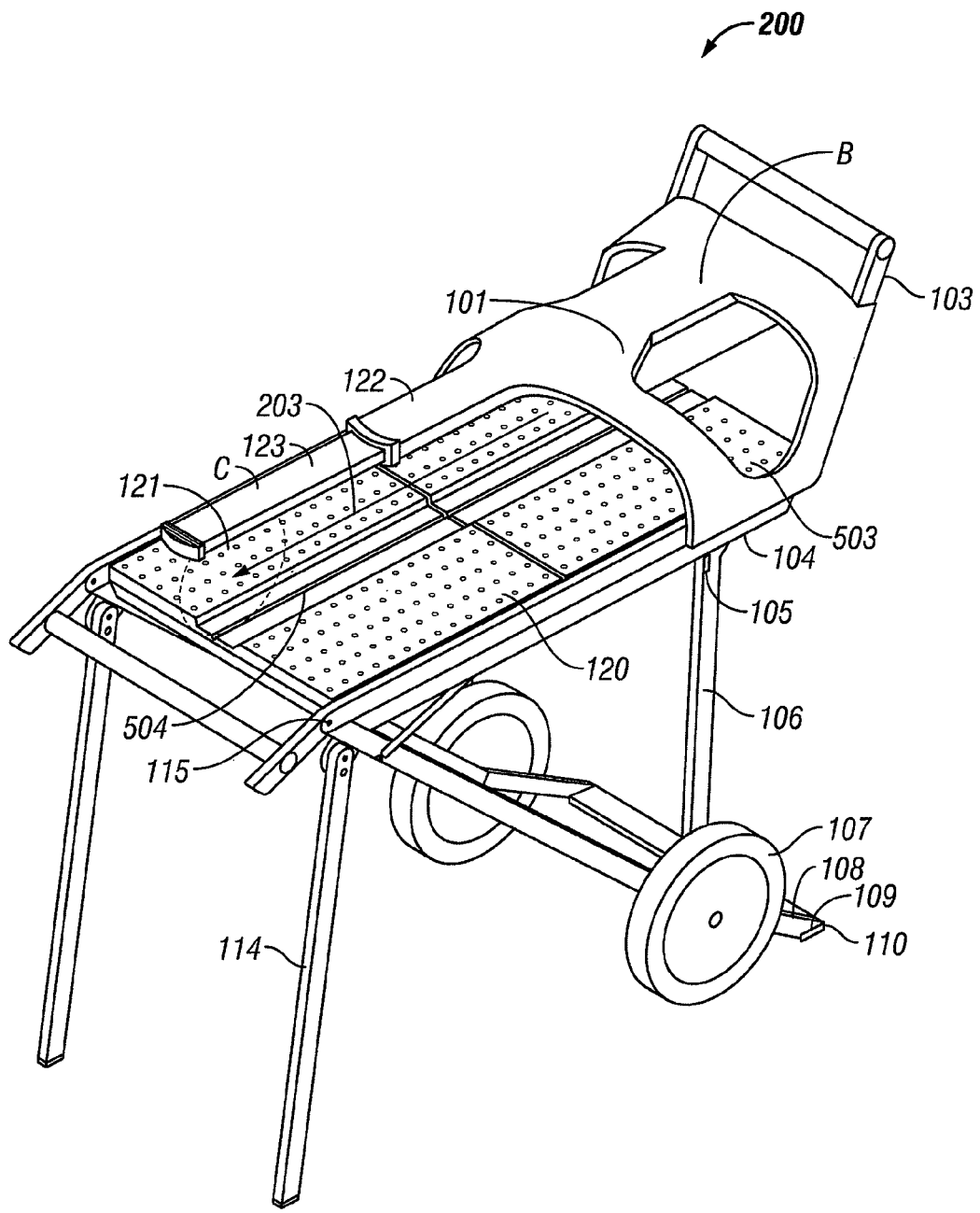

FIG. 2b shows an isometric view of the apparatus shown in FIG. 2a.

It is to be appreciated that insertion of the second tray 120 has the effect of immobilizing the sliding tray 113 to provide a continuous support surface for the larger pieces of substrate that the tile saw can handle in 'sliding saw' mode. It is also possible to omit the second tray so that both the tray 113 and the saw unit 121 slide relative to each other.

In one embodiment the entire tile saw and integrated handtruck are canted forward approximately 5° to lend the apparatus greater stability when it is set up.

Figure 3:
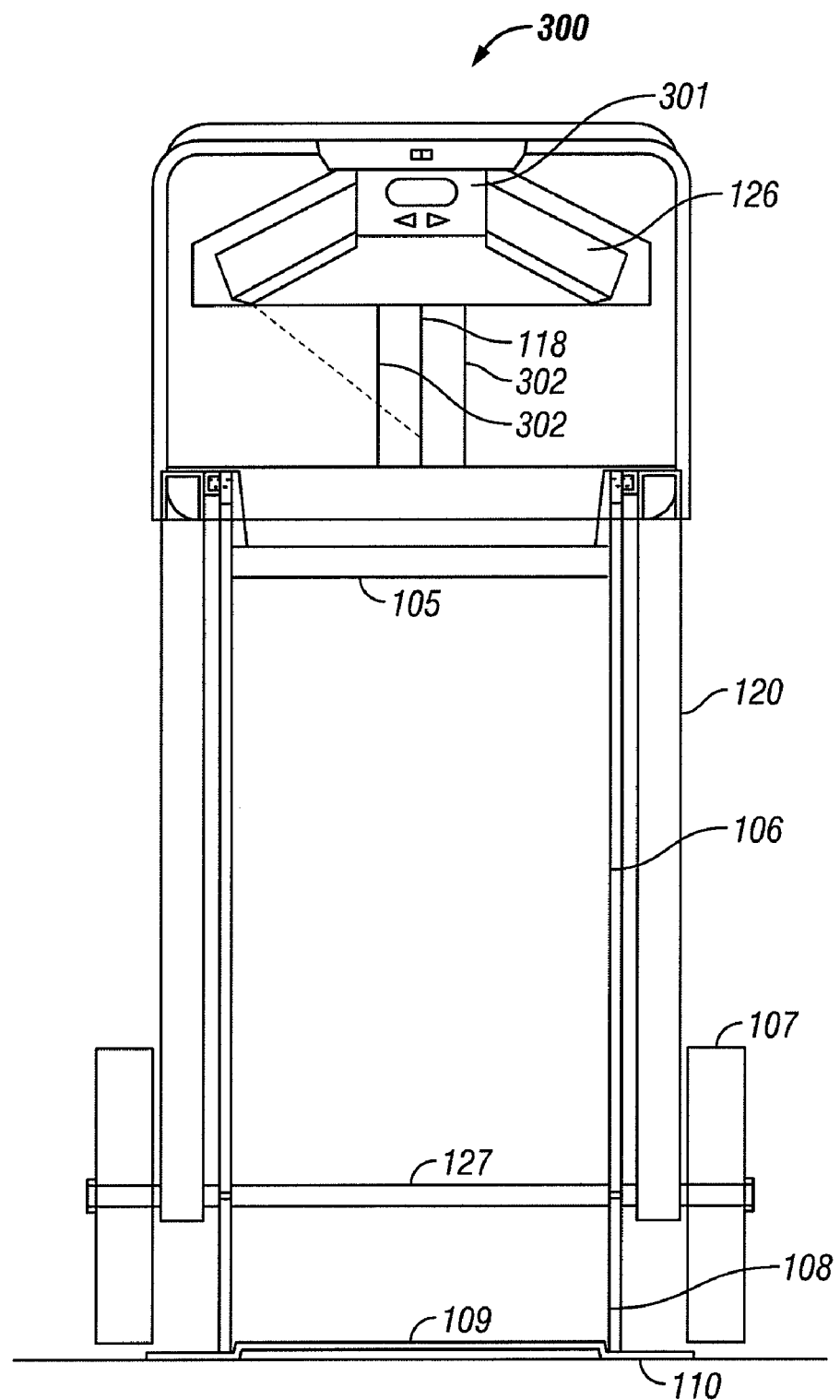
FIG. 3 shows a front elevation of portable, bimodal tile saw set up for use.

Referring to FIG. 3, shown is an elevation of the operator-facing end of the tile saw, set up and ready for use. FIG. 3 provides an alternate view of the fold-down legs 120, the vertical supports 106, the cross braces 105, 109, the fold-down supports 108, the resilient feet 110 and the axle and wheels, 127 and 107 respectively. In one embodiment, the wheels 107 are semi-pneumatic to enhance maneuverability and mobility over a variety of terrain. Preferably, the wheels are approximately 12" in diameter to facilitate transport of the tile saw across relatively uneven terrain.

The handles 126 are preferably stainless steel to increase durability and provide ease of maintenance.

The saw blade 118 is provided with water guards 302 on either side, to shield the saw motor, the surrounding environment and the operator from splashing water.

The tile saw is also provided with one or more sweeps that squeegee coolant from the surface of the material being cut back into the coolant reservoir. One embodiment provides one or more rubber sweeps. Sweeps made from elastomers other than rubber are also within the scope of the invention. The sweeps are positioned such that they can scrape coolant from the surface of the material being cut in either 'sliding tray' mode or 'sliding saw mode.' For example, in 'sliding tray' mode, a sweep attached to the housing can scrape coolant from the surface of the material being cut into the coolant reservoir. In 'sliding saw' mode, a sweep attached to the saw unit itself can scrape coolant from the surface of the material being cut.

Figure 4:
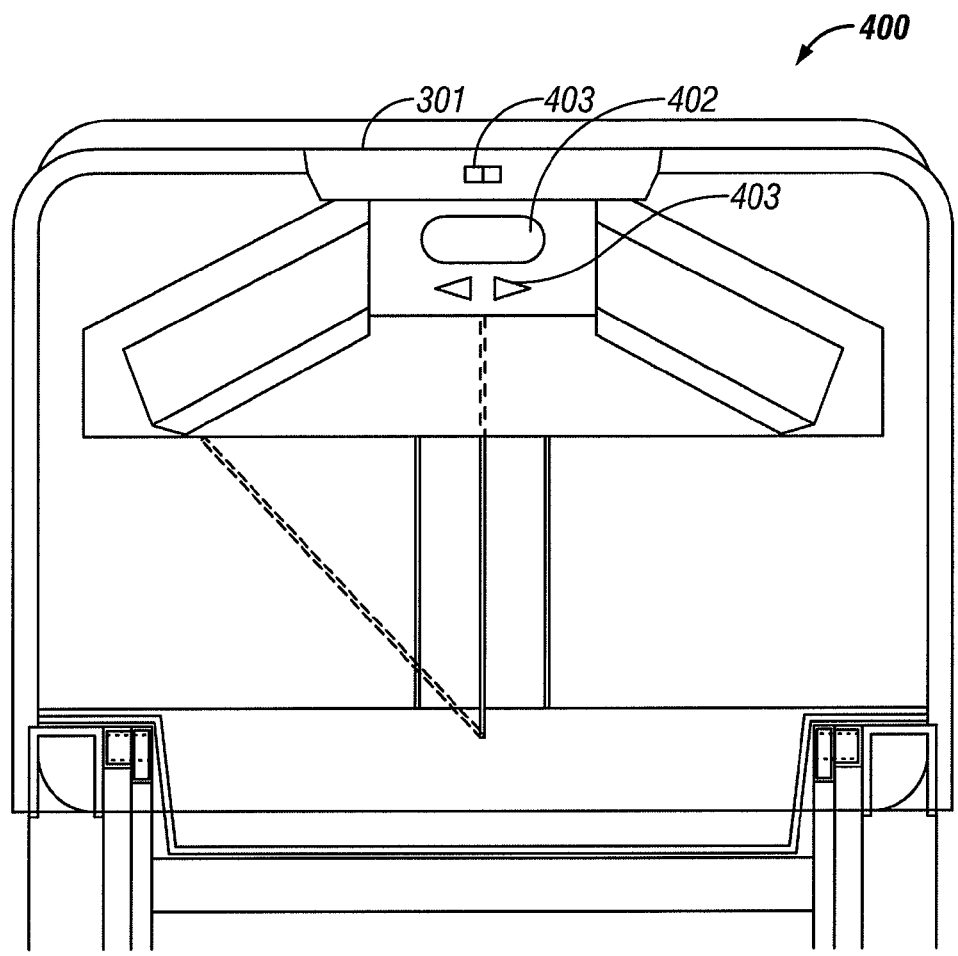
FIG. 4 shows a detailed view of a control panel on the bimodal portable, bimodal tile saw of FIG. 3.

A control panel 301 is shown in greater detail in FIG. 4.

FIG. 4 shows a detailed view 400 of the control panel 301 for the tile saw. In one embodiment, the power switch 403 is an 'ON/OFF' rocker switch. A display element 402 displays the blade angle. 'INCR/DECR' controls 403 allow the operator to change the blade angle.

FIG. 5 shows a top plan view 500 of a bimodal tile saw that shows the housing 101 that includes the rear panel 103 and the arm 122. Projecting from the arm 122 is the telescoping second stage 123 of the arm 122. At the end of the second stage 123 is the on/off switch 403. To illustrate the capability of the tile saw, a 24" square tile 502 is shown in dotted lines diagonally superimposed on the tile saw. Thus, in sliding saw mode, an embodiment of the tile saw is capable of making a continuous cut of 34", the diagonal dimension of a 24" tile. The foregoing tile dimensions and cut lengths are provided for descriptive purposes. Other tile sizes and cut lengths are within the scope of the invention.

FIG. 5 also shows the front slide tray 113 and the rear tray 201 in place. As explained in greater detail with respect to FIGS. 6 and 8, the front sliding tray can slide on rollers in guides fastened to the sides of the water tray 104 when the back tray 201 is removed. A flange 505 along the sides of the water tray 104 provides the surface upon which the guides are attached, as shown in greater detail in FIG. 6. Also shown in greater detail in FIG. 6, the water tray is preferably provided with u-shaped channels 501 that allow the water tray assembly to slide into place on the sub-frame 125. As previously mentioned both trays 113, 201 are provided with drainage holes, preferably countersunk, preferably arranged in a grid pattern 503. Both trays are provided with a centrally-positioned kerf 504 to permit free rotation of the saw blade 118.

Referring now to FIG. 6, shown is a detailed cutaway view of a roller tray and track assembly in a bimodal tile saw. As previously described, the water tray 104 includes a flange 505 upon which an extruded roller guide 606 is attached. Along the flange 505 are a plurality of perforations. Inserted within each perforation is a fastening element 604 such as a self-clinching nut for attaching the roller guide 606 to the flange 505. The roller guide 606 is provided with perforations corresponding to the perforations in the flange 505. A faster such as a screw 605 is inserted into each perforation in the roller guide 606, which fastener is then received by the fastening element 604 to attach roller guide 606 to flange 505. In one embodiment, a non-slip surface 603 such as a rubber mat is laid over the flange 505 with the attached roller guide 606. Thus, the guides are securely but removeably fastened into place so that the slide tray is guided parallel to the blade.

The slide tray 113 has attached to each side a plurality of roller elements 602 fabricated from a resilient material such as rubber or other resilient polymer. Attachment of the roller elements 602 to the tray 113 is by means of a fastener 601 such as a stove bolt or a rivet. In one embodiment, the roller tray 113 and the rear tray 201 are fashioned from a cast metal, for example, cast aluminum. The rear tray 201 actually locks the slide tray 113 into position, simply clipping into place, so that the saw can be used in 'sliding saw' mode, instead of 'sliding tray' mode.

The rollers 602 rest in the guide 606 allowing the roller tray 113 to be freely moved in either direction within the guide 606. FIG. 6 shows the counter-sunk drain holes 503 and the saw blade 118 fitting within the saw blade kerf 504. U-shaped channels 501 allow the tray assembly to be slid into place upon the sub-frame 125. Additionally, the guide 606 is provided with drain holes that allow coolant to readily drain back into the water pan 104.

Figure 7:
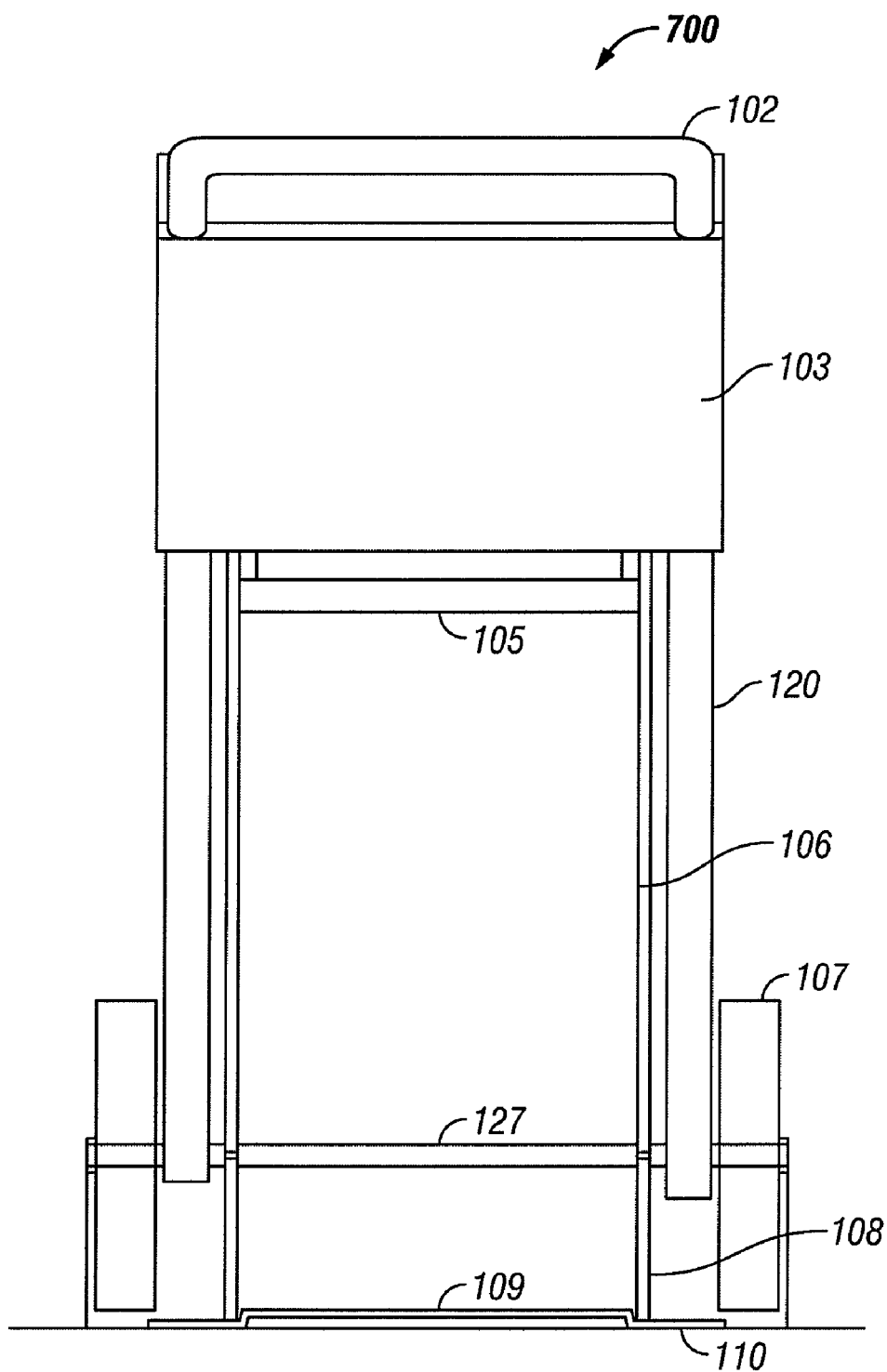
FIG. 7 shows a rear elevation of a portable, bimodal tile saw set up for use.

FIG. 7 shows a rear elevation of a portable, bimodal tile saw set up for use. The sub-frame 125 terminates in a handle 102 for transporting the tile saw. The rear panel 103 of the housing 101 protects the external environment from coolant being sprayed by the rotation of the blade 118.

FIG. 7 also provides an alternate view of the fold-down legs 120, the vertical supports 106, the cross braces 105, 109, the fold-down supports 108, the resilient feet 110 and the axle and wheels, 127 and 107 respectively.

Figure 8:
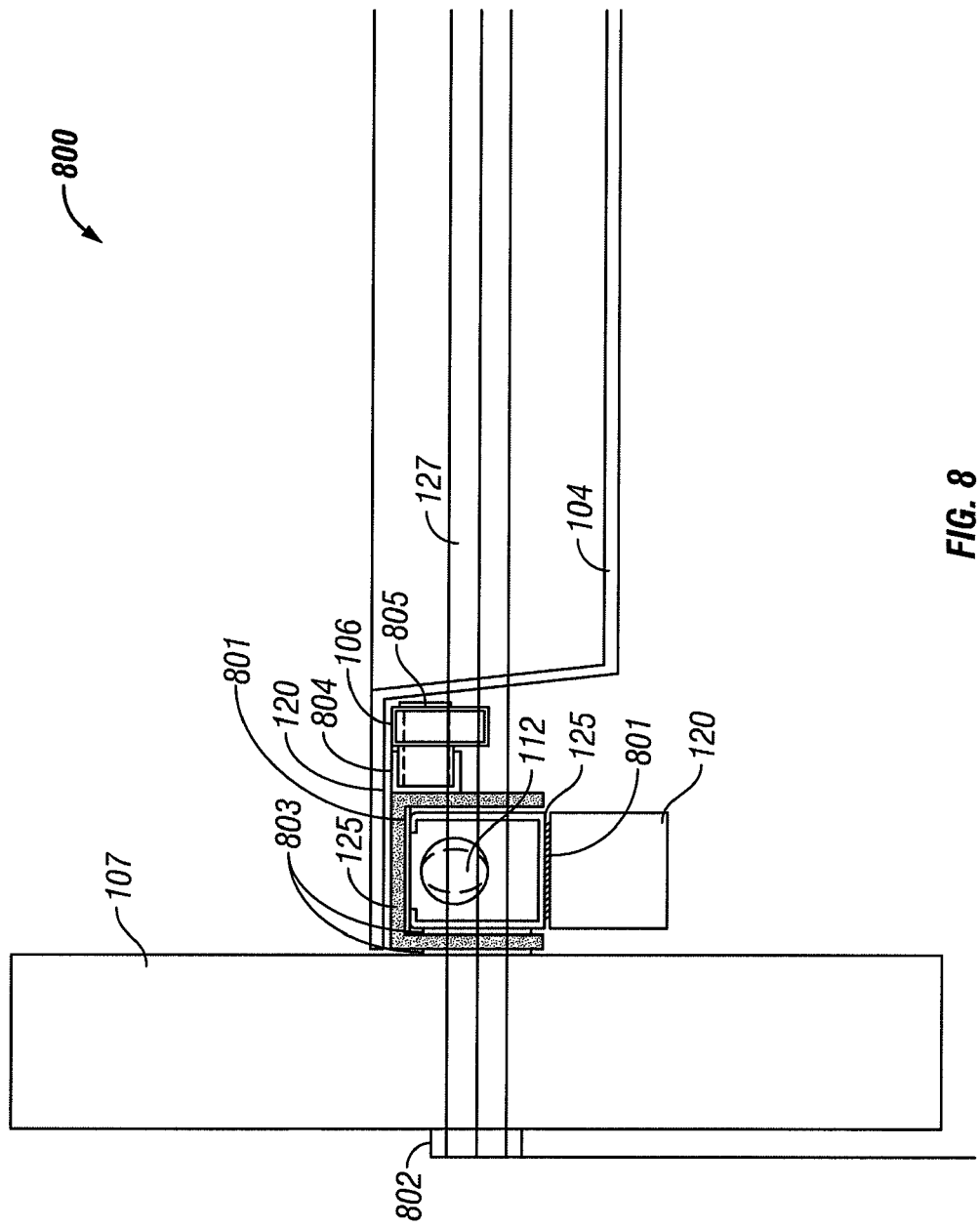
FIG. 8 shows a detailed view of a handtruck assembly in a portable, bimodal tile saw.

FIG. 8 shows a detailed rear elevation 800 of a collapsed handtruck assembly in a bimodal tile saw. While the water tray 104 is ordinarily removed from the sub-frame 125 for transport and storage, the tile saw can also be used with the handtruck in its collapsed position, in which case the water tray 104 is slid into position upon the sub-frame 125. The wheel 107 is fastened to the axle 127 and the sub-frame 125 by means of, for example, a nut 802 and one or more washers 803. Bumpers 801 prevent the various metal parts of the handtruck from contacting each other when the handtruck is collapsed, either for use or for transport or storage, as. in FIGS. 10 and 11.

A vertical support track 128 is secured to an inner surface of the sub-frame125. The vertical support track 128 is fastened to the sub-frame 125 by means of, for example, screws or rivets. An end of a vertical support 106 is provided with an opening that receives a length of metal dowel 805, which is welded into place so that a first end is flush with the medial surface of the support 106 and the opposing end protrudes from the lateral surface of the support 106. The protruding end of the dowel 804 is fitted with a bushing 804 that acts as a bearing between the dowel 804 and the inner surface of the vertical support track 128. Thus, the vertical support 106 is able to move freely back and forth within the vertical support track 128.

A first end of a gas-filled piston assembly 112 is attached to an inner surface of the sub-frame 125. The opposing end of the gas-filled piston assembly is attached to the fold-down leg 120, as shown in FIG. 1. As previously described, the hydraulic assist provided by the gas-filled piston reduces the effort required from the operator to set up and collapse the handtruck.

Figure 9:
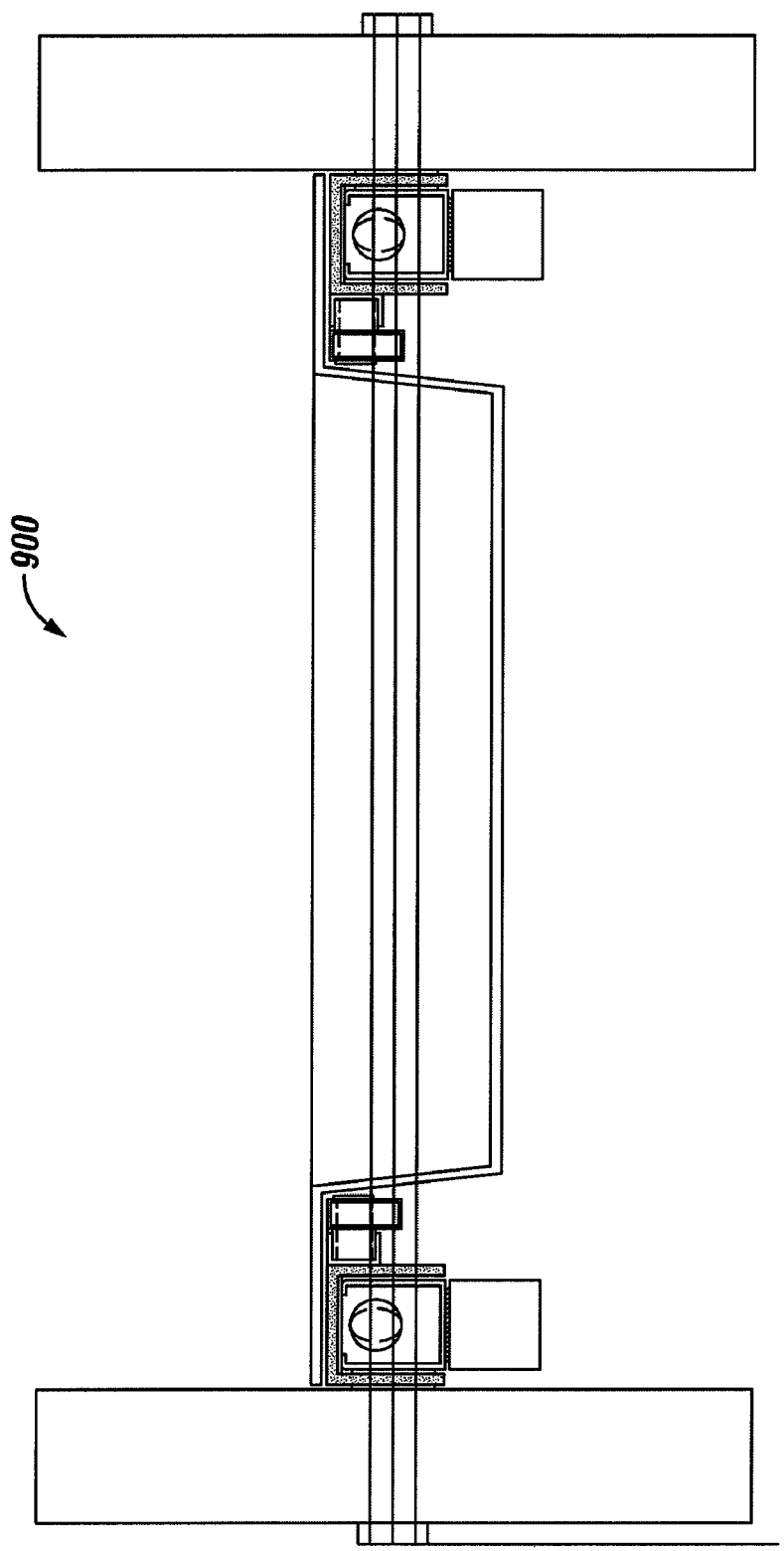
FIG. 9 shows a view of the carriage assembly of FIG. 8 in its entirety.

FIG. 9 shows a complete rear elevation 900 of the assembly shown in FIG. 8. It is to be appreciated that the assemblies on right and left sides of the handtruck are mirror images of each other.

FIG. 10 shows the tile saw configured for transport. A locking knuckle joint 1001 holds the fold-down leg 114 fixed in either its deployed (FIG. 1) position or in its collapsed position. The fold-down leg 114 is collapsed by releasing the locking knuckle joint 1001 and folding the fold-down leg 114 into collapsed position, wherein the knuckle joint locks the leg into position. The vertical supports 106 and the folding legs 120 are retracted and the fold-down support 108 are also retracted. Generally, a single operator, using the handle 116 to maneuver the tile saw, can easily traverse most surfaces. Occasionally, if the terrain is difficult, or if the tile saw needs to be carried, for example, up a steep embankment, two people using both of handles 116 and 102 can carry the apparatus.

As shown in FIG. 11, the tile saw is readily stored in a vertical position. The supports 108 and the handle 102 form a vertical stand for the tile saw.

As previously mentioned, the tile saw can be used in its collapsed position: a parallel position. In the parallel position, the handtruck is fully collapsed and the tile saw rests on the handle 116 and the wheels 107, parallel to the supporting surface.

While the foregoing description has characterized the invention as a tile saw, it is readily apparent that the invention can be used for cutting other substrates besides ceramic tile, for example, stone tile such as granite or marble. Additionally, the invention can be used to cut flagstone or slate roofing. Moreover, the invention can also be used to cut masonry such as bricks, paving bricks and concrete blocks.

In the foregoing specification, the invention has been described with reference to specific exemplary embodiments thereof. It will, however, be evident that various modifications and changes may be made thereto without departing from the broader spirit and scope of the invention as set forth in the appended claims. For example, an embodiment of the tile saw incorporating a mechanical cutting element has been described herein. However, other cutting elements will occur to the ordinarily-skilled practitioner. For example, an embodiment of the invention includes a saw unit that uses electromagnetic energy, such as laser, as the cutting element. The specification and drawings are, accordingly, to be regarded in an illustrative sense rather than a restrictive sense.

The invention claimed is:

1. An apparatus for cutting ceramic material comprising:
   a telescoping track;
   a saw unit suspended from and freely moveable along said telescoping track;
   a first tray for supporting a portion of said ceramic material to be cut, wherein said tray is freely moveable relative to said saw unit along at least one guide member;
   means for temporarily fixing any of a group comprising said saw unit and said first tray in a stationary position wherein a remaining one of said group moves freely relative to said fixed one of said group; and
   a collapsible handtruck removably attached to a sub-frame of said apparatus.

2. The apparatus of claim 1, wherein said telescoping track comprises:
   a first stage continuous with a housing of said apparatus; and
   a second stage that retracts into said housing and that is withdrawn from said housing as an operator pulls said saw unit beyond a fixed end of said first stage, wherein said second stage potentially telescopes to a full length of said second stage.

3. The apparatus of claim 1, wherein said means for fixing any of said group comprises:

a latch for fixing said saw unit into a stationary position; and a second supporting tray, wherein said second supporting tray is removeably placed in a stationary position adjacent to said first supporting tray, wherein placement of said second tray adjacent to said first tray immobilizes said first tray, and wherein said first and second trays together create a continuous supporting surface for said portion of ceramic material to be cut.

4. The apparatus of claim 1, further comprising a laser cutting guide, wherein said laser cutting guide casts a precise beam of light across said portion of ceramic material to be cut for precision cutting.

5. The apparatus of claim 1, further comprising:
a coolant reservoir;
a coolant pump;
at least one coolant line for delivering coolant to a cutting element of said saw unit.

6. The apparatus of claim 5, wherein said cutting element comprises a circular blade having two sides and wherein said at least one coolant line comprises a pair of coolant lines configured to deliver coolant to both sides of said blade.

7. The apparatus of claim 6, further comprising a coolant shield at each side of said blade for confining said coolant to immediate vicinity of said blade.

8. The apparatus of claim 1, wherein said handtruck comprises a plurality of gas-and-piston assemblies to provide a hydraulic assist to an operator when deploying or collapsing said handtruck.

9. The apparatus of claim 1, wherein said handtruck comprises at least one pair of semi-pneumatic wheels.

10. The apparatus of claim 1, wherein said handtruck comprises at least one pair of fold-down supports for maintaining said apparatus in a stable, stationary position with wheels of said handtruck prevented from contacting an underlying surface.

11. The apparatus of claim 1, further comprising:
a housing mounted on said sub-frame, wherein said housing is shaped to contain coolant so that jobsite surfaces are shielded from splashed and sprayed coolant; and
at least one handle, continuous with said sub-frame, for maneuvering and transporting said apparatus.

12. The apparatus of claim 1, further comprising at least one sweep, wherein said at least one sweep scrapes coolant from a surface of said ceramic material to be cut into a coolant reservoir.

13. An apparatus for cutting ceramic material comprising:
a multi-stage track;
a saw unit suspended from and freely moveable along said multi-stage track, wherein said multi-stage track potentially telescopes to full length of a second stage as an operator pulls said saw unit beyond a fixed end of a first stage;
a latch for fixing said saw unit into a stationary position;
a first tray for supporting a portion of said ceramic material to be cut, wherein said tray is freely moveable relative to said saw unit along at least one guide member;
a second supporting tray, wherein said second supporting tray is removeably placed in a stationary position adjacent to said first supporting tray, wherein placement of said second tray adjacent to said first tray immobilizes said first tray, and wherein said first and second trays together create a continuous supporting surface for said portion of ceramic material to be cut;
a laser cutting guide, wherein said laser cutting guide casts a precise beam of light across said portion of ceramic material to be cut for precision cutting;
a cooling system for said cutting element;
a collapsible handtruck removably attached to a sub-frame of said apparatus; and
at least one handle, continuous with said sub-frame, for maneuvering and transporting said apparatus.

14. The apparatus of claim 13, wherein said cooling system comprises:
a coolant reservoir;
a coolant pump;
at least one coolant line for delivering coolant to a cutting element of said saw unit.

15. The apparatus of claim 13, wherein said cutting element comprises a circular blade having two sides and wherein said at least one coolant line comprises a pair of coolant lines configured to deliver coolant to both sides of said blade, and wherein said apparatus further comprises:
a coolant shield at each side of said blade for confining said coolant to immediate vicinity of said blade.

16. The apparatus of claim 13, wherein said handtruck comprises:
a plurality of gas-and-piston assemblies to provide a hydraulic assist to an operator when deploying or collapsing said handtruck;
at least one pair of semi-pneumatic wheels;
at least one pair of fold-down supports for maintaining said apparatus in a stable, stationary position with wheels of said handtruck prevented from contacting an underlying surface during use.

* * * * *